United States Patent
Huang et al.

(10) Patent No.: US 10,177,588 B2
(45) Date of Patent: Jan. 8, 2019

(54) CHARGING CIRCUIT AND CAPACITIVE POWER CONVERSION CIRCUIT AND CHARGING CONTROL METHOD THEREOF

(71) Applicant: RICHTEK TECHNOLOGY CORPORATION, Zhubei, HsinChu (TW)

(72) Inventors: Tsung-Wei Huang, Taipei (TW); Shui-Mu Lin, Taichung (TW); Wei-Jen Huang, New Taipei (TW); Hsien-Chih She, Zhubei (TW); Teng-Cheng Chen, Lienchiang (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 65 days.

(21) Appl. No.: 15/598,956

(22) Filed: May 18, 2017

(65) Prior Publication Data

US 2018/0083456 A1    Mar. 22, 2018

Related U.S. Application Data

(60) Provisional application No. 62/396,897, filed on Sep. 20, 2016.

(30) Foreign Application Priority Data

Feb. 15, 2017  (TW) ............................. 106104841 A

(51) Int. Cl.
*H02J 7/00*  (2006.01)
*H02M 3/06*  (2006.01)
*H02M 3/07*  (2006.01)
*H02J 7/02*  (2016.01)
*H02J 7/10*  (2006.01)

(52) U.S. Cl.
CPC ............... *H02J 7/007* (2013.01); *H02J 7/02* (2013.01); *H02M 3/06* (2013.01); *H02M 3/07* (2013.01); *H02J 2007/0059* (2013.01); *H02J 2007/0062* (2013.01); *H02J 2007/10* (2013.01)

(58) Field of Classification Search
CPC ..................................................... H02J 7/007
USPC ....................................................... 320/162
See application file for complete search history.

(56) References Cited

U.S. PATENT DOCUMENTS

2018/0083457 A1* 3/2018 Huang .................... H02J 7/007
2018/0083458 A1* 3/2018 Huang .................... H02J 7/007
2018/0083459 A1* 3/2018 Huang .................... H02J 7/0008

* cited by examiner

*Primary Examiner* — Suchin Parihar
(74) *Attorney, Agent, or Firm* — Tung & Associates

(57) ABSTRACT

A charging circuit for providing a charging current to a battery includes a power delivery unit and a capacitive power conversion circuit. The power delivery unit converts an input power to a DC output voltage and current, and regulates the DC output current to a predetermined output current level. The capacitive power conversion circuit includes a conversion switch circuit including plural conversion switches coupled to one or more capacitors, and a conversion control circuit which operates the plural conversion switches in plural conversion periods to connect the one or more capacitors between a pair of nodes selected from plural voltage division nodes, the DC output voltage, and a ground node periodically, so that the level of the charging current is scaled-up of the predetermined output current level.

20 Claims, 3 Drawing Sheets

US 10,177,588 B2

CHARGING CIRCUIT AND CAPACITIVE POWER CONVERSION CIRCUIT AND CHARGING CONTROL METHOD THEREOF

CROSS REFERENCE

The present invention claims priority to U.S. 62/396,897, filed on Sep. 20, 2016, and TW 106104841, filed on Feb. 15, 2017.

BACKGROUND OF THE INVENTION

Field of Invention

The present invention relates to a charging circuit, particularly to a current scale-up charging circuit. The present invention also relates to a capacitive power conversion circuit and a charging control method for use in the charging circuit.

Description of Related Art

FIG. 1 shows a prior art charging circuit (charging circuit 1) which comprises an adaptor 11 capable of directly charging a battery 50. The adaptor 11 can provide a charging current IBAT through a cable 20 (for example a USB cable) and a load switch 40 to the battery 50 for charging the battery 50 by a constant current. However, when using a USB standard cable, the maximum current is limited by the cable current rating, which is 5 A or lower, and therefore a longer charging time is required. If it is desired to raise the charging current, for example to 8 A or higher to expedite the charging time, a specially-designed fast charging cable with a larger diameter is required. However, it is inconvenient to use the fast charging cable, because first, it is a non-standard cable, and second, the fast charging cable is less flexible for accommodation due to its larger diameter.

FIG. 2 shows a prior art charging circuit (charging circuit 2) which includes a switching conversion circuit 60 which can convert the power provided by the adaptor 11 (for example but not limited to 5V, 9V, or 12V VBUS of USB PD) to a charging current IBAT to charge a battery 50 by a constant current. The prior art circuit in FIG. 2 has a drawback that it is very difficult to optimize the choices of the specifications of the inductor and switches (both not shown) of the switching conversion circuit 60 so that critical parameters such as the charging current, current ripple amplitude, conduction resistance of the switch, power conversion efficiency and etc. can be optimized.

Compared to the prior art in FIG. 1, the present invention is advantageous in providing a scale-up charging current for charging a battery to shorten the charging time, while a standard cable such as a USB compliant cable can be used, through which only a relatively lower current is allowed. Compared to the prior art in FIG. 2, the present invention is advantageous in not requiring an inductor, having a smaller size, lower cost, and easier optimization for component selections to maximize power conversion efficiency.

SUMMARY OF THE INVENTION

From one perspective, the present invention provides a charging control method, for use in controlling a charging circuit to provide a charging power to a battery, wherein the charging power includes a charging voltage and a charging current, and the charging circuit includes a power delivery unit and one or more capacitive power conversion circuits, wherein the power delivery unit converts an input power to a DC output power, the DC output power including a DC output voltage and a DC output current; and wherein the capacitive power conversion circuit comprises a conversion switch circuit which includes plural conversion switches, and one or more conversion capacitors coupled to the conversion switch circuit; the charging control method comprising: regulating the DC output current to a predetermined output current level by the power delivery unit; and converting the DC output power to the charging power by the capacitive power conversion circuit such that the charging current level is scaled-up of the predetermined output current level substantially by a predetermined factor, the factor being larger than 1 whereby the charging current is larger than the DC output current; wherein the step of converting the DC output power to the charging power includes: during plural conversion time periods, operating the plural conversion switches so as to electrically connect the one or more conversion capacitors between a pair of nodes selected from one or more voltage division nodes, the DC output voltage, and a ground node periodically, wherein the charging power is electrically connected to one of the one or more voltage division nodes.

In one embodiment, the step of converting the DC output power to the charging power further includes: generating a synchronous control signal; and synchronizing the plural conversion time periods of the plural capacitive power conversion circuits according to the synchronous control signal.

In one embodiment, the step of converting the DC output power to the charging power further includes: during anyone of the conversion periods, at most one of the plural conversion capacitors being electrically connected between the pair of nodes selected from the one or more voltage division nodes, the DC output voltage, and the ground node.

In one embodiment, the one or more conversion capacitors include a first conversion capacitor, and the plural conversion time periods include a first conversion time period and a second conversion time period; wherein the step of converting the DC output power to the charging power further includes: operating the plural conversion switches of the capacitive power conversion circuit to connect a first terminal of the first conversion capacitor to the DC output voltage and the charging voltage during the first conversion time period and the second conversion time period respectively, and to connect a second terminal of the first conversion capacitor to the charging voltage and the ground node during the first conversion time period and the second conversion time period respectively; wherein the charging current level is substantially twice the predetermined output current level.

In one embodiment, the one or more conversion capacitors include a second conversion capacitor; wherein the step of converting the DC output power to the charging power further includes: operating the plural conversion switches of the capacitive power conversion circuit to connect a first terminal of the second conversion capacitor to the DC output voltage and the charging voltage during the second conversion time period and the first conversion time period respectively, and to connect a second terminal of the second conversion capacitor to the charging voltage and the ground node during the second conversion time period and the first conversion time period respectively.

In one embodiment, the charging control method of claim 1, further comprises: sensing the DC output current or the charging current to generate a current related signal; and regulating the DC output current to the predetermined output current level according to the current related signal by the power delivery unit.

From another perspective, the present invention provides a charging circuit, comprising a power delivery unit, a capacitive power conversion circuit coupled to the power delivery unit, and a cable coupled to the power delivery unit and the capacitive power conversion circuit, wherein the power delivery unit and the capacitive power conversion circuit are controlled by anyone of the aforementioned charging control methods.

In one embodiment, the cable is a USB PD (Universal Serial Bus Power Delivery) specification compliant cable which includes a power line for transmitting the DC output power.

In one embodiment, the cable includes a signal line for transmitting the current related signal.

From another perspective, the present invention provides a capacitive power conversion circuit, for use in a charging circuit which provides a charging power to a battery, wherein the charging power includes a charging voltage and a charging current, and the charging circuit includes a power delivery unit for converting an input power to a DC output power, the DC output power including a DC output voltage and a DC output current; wherein the power delivery unit is configured to regulate the DC output current to a predetermined output current level; the capacitive power conversion circuit comprising: a conversion switch circuit which includes plural conversion switches, configured to be operably coupled to one or more conversion capacitors; and a conversion control circuit, configured to operably generate a switch control signal to operate the plural conversion switches so as to electrically connect the one or more conversion capacitors between a pair of nodes selected from one or more voltage division nodes, the DC output voltage, and a ground node periodically during plural conversion time periods, such that the charging current level is scaled-up of the predetermined output current level substantially by a predetermined factor, the factor being larger than 1 whereby the charging current is larger than the DC output current; wherein the charging power is electrically connected to one of the one or more voltage division nodes.

In one embodiment, the conversion control circuit further generates a synchronous control signal for synchronizing the plural conversion time periods of the capacitive power conversion circuit with another capacitive power conversion circuit.

In one embodiment, during anyone of the conversion periods, at most one of the plural conversion capacitors is electrically connected between the pair of nodes selected from the one or more voltage division nodes, the DC output voltage, and the ground node.

In one embodiment, the one or more conversion capacitors include a first conversion capacitor, and the plural conversion time periods include a first conversion time period and a second conversion time period; wherein the plural conversion switches of the capacitive power conversion circuit are configured to operably connect a first terminal of the first conversion capacitor to the DC output voltage and the charging voltage during the first conversion time period and the second conversion time period respectively, and to connect a second terminal of the first conversion capacitor to the charging voltage and the ground node during the first conversion time period and the second conversion time period respectively; whereby the charging current level is substantially twice the predetermined output current level.

In one embodiment, the one or more conversion capacitors include a second conversion capacitor; wherein the plural conversion switches of the capacitive power conversion circuit are configured to operably connect a first terminal of the second conversion capacitor to the DC output voltage and the charging voltage during the second conversion time period and the first conversion time period respectively, and to connect a second terminal of the second conversion capacitor to the charging voltage and the ground node during the second conversion time period and the first conversion time period respectively.

In one embodiment, the conversion control circuit further senses the DC output current or the charging current to generate a current related signal, and the power delivery unit regulates the DC output current to the predetermined output current level according to the current related signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
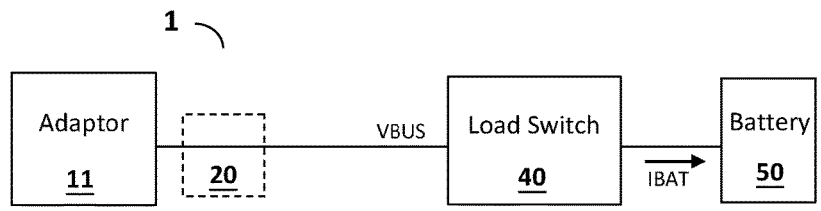
FIG. 1 shows a schematic diagram of a prior art charging circuit.
Figure 2:
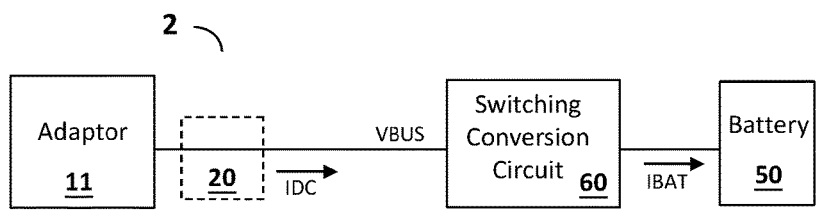
FIG. 2 shows a schematic diagram of another prior art charging circuit.
Figure 3:
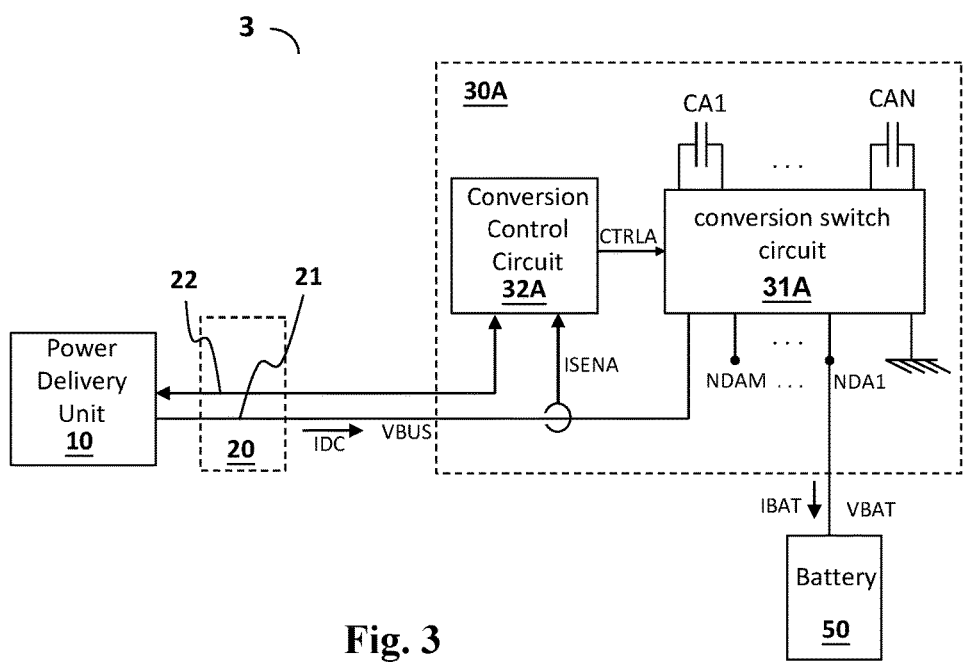
FIG. 3 shows a schematic diagram of an embodiment of the charging circuit according to the present invention.

FIG. 3 shows one embodiment of the charging circuit according to the present invention (charging circuit 3). The charging circuit 3 is configured to operably provide a charging power to a battery 50, wherein the charging power includes a charging voltage VBAT and a charging current IBAT. The charging circuit 3 includes a power delivery unit 10 and a capacitive power conversion circuit 30A. The power delivery unit 10 converts an input power to a DC output power which includes a DC output voltage VBUS and a DC output current IDC. The power delivery unit 10 may be for example an adaptor which converts the input power in an AC form to the aforementioned DC output power, or maybe a DC-DC conversion circuit which converts the input power from for example but not limited to a power bank to the aforementioned DC output power. The power delivery unit 10 regulates the DC output current IDC to a predetermined output current level. In one embodiment, the power delivery unit 10 can support a direct constant-current charging mode, wherein the power delivery unit 10 directly charges the battery 50 by a constant current bypassing the capacitive power conversion circuit 30A (the bypassing circuit is not shown).

The capacitive power conversion circuit 30A converts the DC output power to the charging power which includes a charging voltage VBAT and a charging current IBAT. The capacitive power conversion circuit 30A comprises: a conversion switch circuit 31A which includes plural conversion switches (to be illustrated in other figures), and the conversion switch circuit 31A being coupled to one or more conversion capacitors (for example CA1-CAN shown in FIG. 3, wherein N is a natural number); and a conversion control circuit 32A which is configured to operably generate a switch control signal CTRLA to operate the plural conversion switches so as to electrically connect the one or more conversion capacitors CA1-CAN between a pair of nodes selected from one or more voltage division nodes (for example ND1-NDM shown in FIG. 3, wherein M is a natural number), the DC output voltage VBUS, and a ground node GND periodically during plural conversion time periods, such that the charging current level of IBAT is scaled-up of the predetermined output current level of IDC substantially by a predetermined factor K, the factor K being larger than 1 whereby the charging current IBAT is larger than the DC output current IDC; wherein the charging power is electrically connected to one node (for example corresponding to the ND1 in FIG. 3) among the one or more voltage division nodes such that the charging current IBAT flows through the node. In one embodiment, the capacitive power conversion circuit 30A includes for example but not limited to a divider charge pump.

According to the present invention, the aforementioned "predetermined" DC current level may be a fixed value, or an adjustable variable. Also note that, although it is desired for the charging current IBAT to be scaled-up exactly by a predetermined factor K, however due to non-idealities caused by for example imperfection of components or imperfect matching among components, the level of the actual charging current IBAT may not be exactly equal to K times the predetermined DC output current level, but just close to K times, so "substantially" means that there is a tolerable range around the target factor K. In one embodiment with only one voltage division node, the factor K is 2, that is, the charging current level of IBAT is substantially 2 times the predetermined output current level. In other embodiments with plural voltage division nodes, the factor K varies depending on which node the charging power is electrically connected to, and K is not limited to being an integer.

Still referring to FIG. 3, in one embodiment, in the charging circuit of the present invention (e.g. charging circuit 3), the power delivery unit 10 is further coupled to the capacitive power conversion circuit (e.g. the capacitive power conversion circuit 30A) by a cable 20, wherein the cable 20 is a USB PD (Universal Serial Bus Power Delivery) or USB specification compliant cable which includes a power line 21 and a signal line 22, wherein the power line 21 is for use in transmitting the DC output power. The cable 20 is not necessarily required and may be omitted in other embodiments.

Still referring to FIG. 3, in one embodiment, the conversion control circuit (e.g. the conversion control circuit 32A) senses the DC output current IDC to generate a current related signal (i.e. ISENA), and the power delivery unit 10 regulates the DC output current IDC to the predetermined output current level according to the current related signal ISENA. In one embodiment, the current related signal ISENA may be obtained by sensing the charging current IBAT. In one preferred embodiment, the conversion control circuit 32A transmits the current related signal ISENA through the signal line 22.

Figure 4:
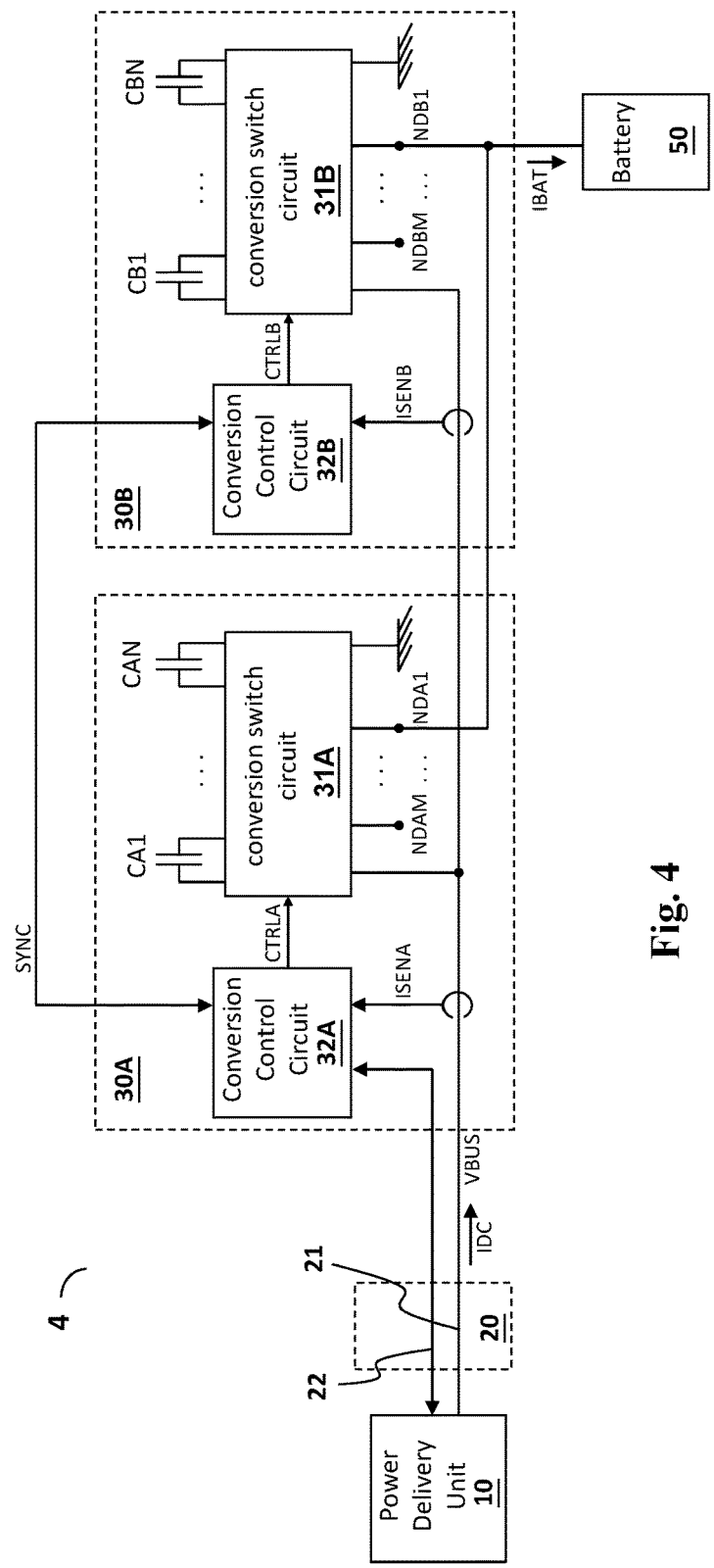
FIG. 4 shows a schematic diagram of an embodiment of the charging circuit according to the present invention.

The charging circuit of the present invention may include plural capacitive power conversion circuits. As an example, referring to FIG. 4 which shows a schematic diagram of one embodiment of the charging circuit of the present invention (the charging circuit 4), in this embodiment, the charging circuit 4 further includes a capacitive power conversion circuit 30B which is coupled to the capacitive power conversion circuit 30A in parallel to jointly generate the charging power. In such an embodiment which includes plural capacitive power conversion circuits, the equivalent resistance on the charging path and the ripple of the charging voltage can be reduced, and therefore the conversion efficiency can be improved. In one preferred embodiment, one of the conversion control circuits (the conversion control circuit 32A or 32B) may generate and the other may receive a synchronous signal SYNC to control the plural conversion time periods of the plural capacitive power conversion circuits (the conversion control circuits 32A and 32B) to be synchronous. The term "synchronous" means that the phases of the plural conversion time periods have a predetermined phase relationship, for example but not limited to in-phase, out-of-phase, phase interleaving, or other forms.

Figure 5:
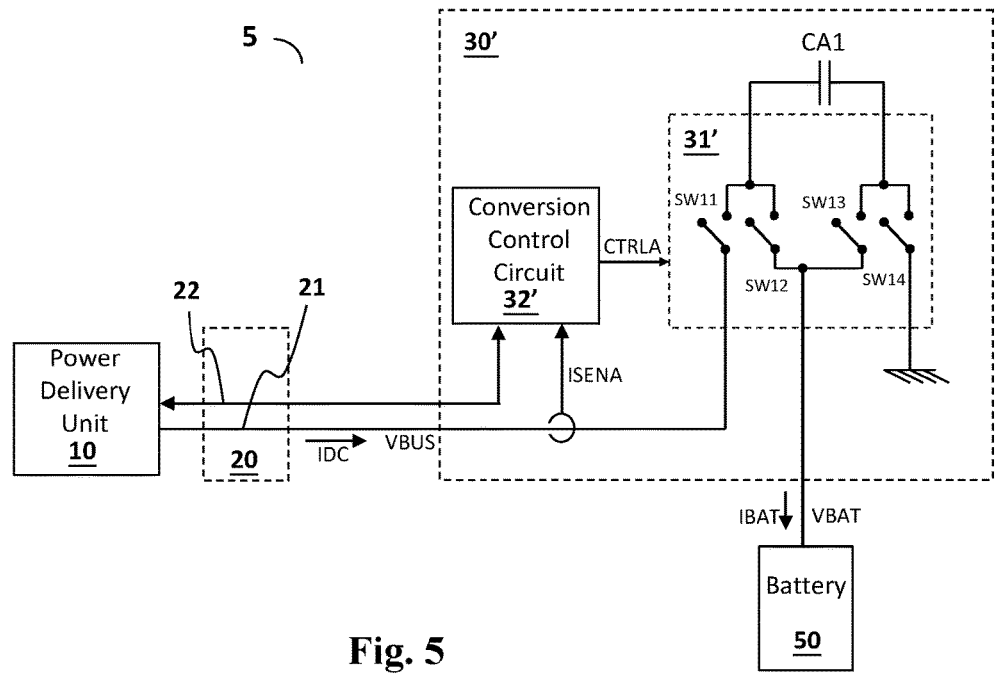
FIG. 5 shows a schematic diagram of embodiments of the charging circuit and the capacitive power conversion circuit thereof according to the present invention.

In one embodiment when there are plural conversion capacitors (for example CA1-CAN in FIG. 3), the plural conversion capacitors are not connected in parallel at any moment when the plural conversion capacitors are electrically connected to the aforementioned pair of nodes. In other words, during anyone of the conversion periods, at most one of the plural conversion capacitors is electrically connected between the pair of nodes selected from the one or more voltage division nodes, the DC output voltage, and the ground node Referring to FIG. 5 which shows one embodiment of the capacitive power conversion circuit (the capacitive power conversion circuit 30') of the charging circuit according to the present invention (e.g. charging circuit 3), in the capacitive power conversion circuit 30', the conversion switch circuit 31' includes plural conversion switches (for example the SW11, SW12, SW13 and SW14 shown in the figure), coupled to the conversion capacitor CA1. In this embodiment, the plural conversion time periods include a first conversion time period and a second conversion time period. The conversion control circuit 32' operates the plural conversion switches SW11, SW12, SW13 and SW14 to connect a first terminal of the conversion capacitor CA1 to the DC output voltage VBUS and the charging voltage VBAT during the first conversion time period and the second conversion time period respectively, and to connect a second terminal of the conversion capacitor CA1 to the charging voltage VBAT and the ground node GND during the first conversion time period and the second conversion time period respectively, such that the charging current level of IBAT is substantially twice the predetermined output current level.

Figure 6:
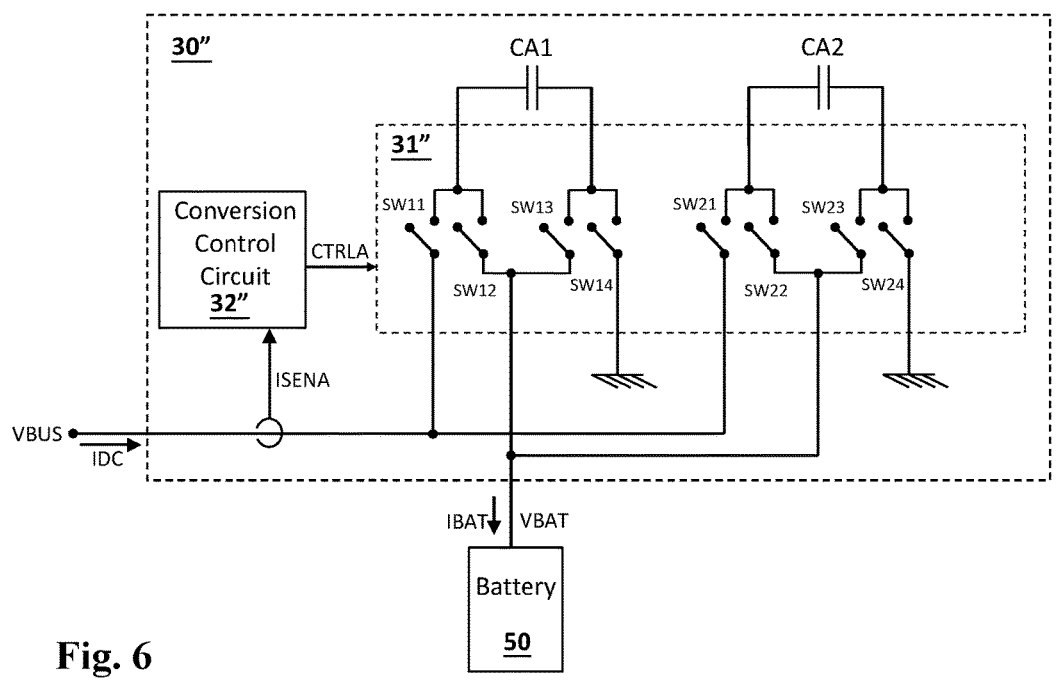
FIG. 6 shows a schematic diagram of an embodiment of the capacitive power conversion circuit of the charging circuit according to the present invention.

Referring to FIG. 6 which shows one embodiment of the capacitive power conversion circuit (the capacitive power conversion circuit 30") of the charging circuit according to the present invention (e.g. charging circuit 3), the capacitive power conversion circuit 30" is similar to the aforementioned capacitive power conversion circuit 30' but they differ in that the conversion switch circuit 31" further includes plural conversion switches such as SW21, SW22, SW23 and SW24 coupled to the conversion capacitor CA2 as shown in the figure. The conversion control circuit 32" operates the plural conversion switches SW11, SW12, SW13 and SW14 in the same way as in the aforementioned embodiment, while it further operates the conversion switches SW21, SW22, SW23 and SW24 to connect a first terminal of the conversion capacitor CA2 to the DC output voltage VBUS and the charging voltage IBAT during the second conversion time period and the first conversion time period respectively, and to connect a second terminal of the conversion capacitor CA2 to the charging voltage VBAT and the ground node GND during the second conversion time period and the first conversion time period respectively. In other words, the connection of the conversion capacitor CA1 and the connection of the conversion capacitor CA2 between the aforementioned pair of nodes are out-of-phase to each other.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, capacitive power conversion circuits controlling different numbers of conversion capacitors can be used together. As an example, the charging circuit of the present invention may include plural capacitive power conversion circuits, one of which is coupled to and controls one conversion capacitor, and another of which is coupled to and control plural conversion capacitors. Furthermore, those skilled in this art can readily conceive variations and modifications within the spirit of the present invention. For example, the polarities of the conversion capacitors as they are connected to the nodes can be arranged differently, for example sometimes positive and sometimes negative, to increase the range or resolution of the current scale-up factor K. As another example, the aforementioned synchronous control signal may alternatively be one provided externally, which still can achieve the purpose of synchronizing the operations among plural capacitive power conversion circuits. As a further example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charging control method, for use in controlling a charging circuit to provide a charging power to a battery, wherein the charging power includes a charging voltage and a charging current, and the charging circuit includes a power delivery unit and one or more capacitive power conversion circuits, wherein the power delivery unit converts an input power to a DC output power, the DC output power including a DC output voltage and a DC output current; and wherein the capacitive power conversion circuit comprises a conversion switch circuit which includes plural conversion switches, and one or more conversion capacitors coupled to the conversion switch circuit; the charging control method comprising:
regulating the DC output current to a predetermined output current level by the power delivery unit; and
converting the DC output power to the charging power by the capacitive power conversion circuit such that the charging current has a charging current level which is scaled-up of the predetermined output current level substantially by a predetermined factor, the factor being larger than 1 whereby the charging current is larger than the DC output current;
wherein the step of converting the DC output power to the charging power includes:
during plural conversion time periods, operating the plural conversion switches so as to electrically connect the one or more conversion capacitors between a pair of nodes selected from one or more voltage division nodes, the DC output voltage, and a ground node periodically, wherein the charging power is electrically connected to one of the one or more voltage division nodes.

2. The charging control method of claim 1, wherein there are plural capacitive power conversion circuits and the step of converting the DC output power to the charging power further includes:
generating a synchronous control signal; and
synchronizing the plural conversion time periods of the plural capacitive power conversion circuits according to the synchronous control signal.

3. The charging control method of claim 1, wherein the step of converting the DC output power to the charging power further includes:
during anyone of the conversion periods, at most one of the plural conversion capacitors being electrically connected between the pair of nodes selected from the one or more voltage division nodes, the DC output voltage, and the ground node.

4. The charging control method of claim 1, wherein the one or more conversion capacitors include a first conversion capacitor, and the plural conversion time periods include a first conversion time period and a second conversion time period; wherein the step of converting the DC output power to the charging power further includes:
operating the plural conversion switches of the capacitive power conversion circuit to connect a first terminal of the first conversion capacitor to the DC output voltage and the charging voltage during the first conversion time period and the second conversion time period respectively, and to connect a second terminal of the first conversion capacitor to the charging voltage and the ground node during the first conversion time period and the second conversion time period respectively;
whereby the charging current level is substantially twice the predetermined output current level.

5. The charging control method of claim 4, wherein the one or more conversion capacitors include a second conversion capacitor; and wherein the step of converting the DC output power to the charging power further includes:
operating the plural conversion switches of the capacitive power conversion circuit to connect a first terminal of the second conversion capacitor to the DC output voltage and the charging voltage during the second conversion time period and the first conversion time period respectively, and to connect a second terminal of the second conversion capacitor to the charging voltage and the ground node during the second conversion time period and the first conversion time period respectively.

6. The charging control method of claim 1, further comprising:
sensing the DC output current or the charging current to generate a current related signal; and
regulating the DC output current to the predetermined output current level according to the current related signal by the power delivery unit.

7. A charging circuit, comprising:
a power delivery unit configured to operably convert an input power to a DC output power, the DC output power including a DC output voltage and a DC output current, wherein the power delivery unit is configured to operably regulate the DC output current to a predetermined output current level;
a capacitive power conversion circuit coupled to the power delivery unit, and configured to operably convert the DC output power to a charging power for charging a battery, the charging power including a charging voltage and a charging current, wherein the charging current has a charging current level which is scaled-up of the predetermined output current level substantially by a predetermined factor, the factor being larger than 1 whereby the charging current is larger than the DC output current; and
a cable coupled to the power delivery unit and the capacitive power conversion circuit,
wherein the capacitive power conversion circuit includes a conversion switch circuit which includes plural conversion switches, and one or more conversion capacitors coupled to the conversion switch circuit, and
wherein during plural conversion time periods, the plural conversion switches electrically connect the one or more conversion capacitors between a pair of nodes selected from one or more voltage division nodes, the DC output voltage, and a ground node periodically, wherein the charging power is electrically connected to one of the one or more voltage division nodes.

8. The charging circuit of claim 7, comprising plural capacitive power conversion circuits, wherein the plural conversion time periods of the plural capacitive power conversion circuits are synchronized according to the synchronous control signal.

9. The charging circuit of claim 7, wherein during anyone of the conversion periods, at most one of the plural conversion capacitors is electrically connected between the pair of nodes selected from the one or more voltage division nodes, the DC output voltage, and the ground node.

10. The charging circuit of claim 7, wherein the one or more conversion capacitors include a first conversion capacitor, and the plural conversion time periods include a first conversion time period and a second conversion time period; and wherein the plural conversion switches of the capacitive power conversion circuit are configured to operably connect a first terminal of the first conversion capacitor to the DC output voltage and the charging voltage during the first conversion time period and the second conversion time period respectively, and to connect a second terminal of the first conversion capacitor to the charging voltage and the ground node during the first conversion time period and the second conversion time period respectively;
whereby the charging current level is substantially twice the predetermined output current level.

11. The charging circuit of claim 10, wherein the one or more conversion capacitors include a second conversion capacitor; and wherein the plural conversion switches of the capacitive power conversion circuit are configured to operably connect a first terminal of the second conversion capacitor to the DC output voltage and the charging voltage during the second conversion time period and the first conversion time period respectively, and to connect a second terminal of the second conversion capacitor to the charging voltage and the ground node during the second conversion time period and the first conversion time period respectively.

12. The charging circuit of claim 7, wherein the power delivery unit is configured to regulate the DC output current to the predetermined output current level according to a current related signal obtained by sensing the DC output current or the charging current.

13. The charging circuit of claim 7, wherein the cable is a USB PD (Universal Serial Bus Power Delivery) specification compliant cable which includes a power line for transmitting the DC output power.

14. The charging circuit of claim 12, wherein the cable is a USB PD (Universal Serial Bus Power Delivery) specification compliant cable which includes a signal line for transmitting the current related signal.

15. A capacitive power conversion circuit, for use in a charging circuit which provides a charging power to a battery, wherein the charging power includes a charging voltage and a charging current, and the charging circuit includes a power delivery unit for converting an input power to a DC output power, the DC output power including a DC output voltage and a DC output current; wherein the power delivery unit is configured to regulate the DC output current to a predetermined output current level; the capacitive power conversion circuit comprising:
a conversion switch circuit which includes plural conversion switches, configured to be operably coupled to one or more conversion capacitors; and
a conversion control circuit, configured to operably generate a switch control signal to operate the plural conversion switches so as to electrically connect the one or more conversion capacitors between a pair of nodes selected from one or more voltage division nodes, the DC output voltage, and a ground node periodically during plural conversion time periods, such that the charging current has a charging current level which is scaled-up of the predetermined output current level substantially by a predetermined factor, the factor being larger than 1 whereby the charging current is larger than the DC output current; wherein the charging power is electrically connected to one of the one or more voltage division nodes.

16. The capacitive power conversion circuit of claim 10, wherein the conversion control circuit further generates a synchronous control signal for synchronizing the plural conversion time periods of the capacitive power conversion circuit with another capacitive power conversion circuit.

17. The capacitive power conversion circuit of claim 15, wherein during anyone of the conversion periods, at most one of the plural conversion capacitors is electrically connected between the pair of nodes selected from the one or more voltage division nodes, the DC output voltage, and the ground node.

18. The capacitive power conversion circuit of claim 15, wherein the one or more conversion capacitors include a first conversion capacitor, and the plural conversion time periods include a first conversion time period and a second conversion time period; and wherein the plural conversion switches of the capacitive power conversion circuit are configured to operably connect a first terminal of the first conversion capacitor to the DC output voltage and the charging voltage during the first conversion time period and the second conversion time period respectively, and to connect a second terminal of the first conversion capacitor to the charging voltage and the ground node during the first conversion time period and the second conversion time period respectively;
whereby the charging current level is substantially twice the predetermined output current level.

19. The capacitive power conversion circuit of claim 18, wherein the one or more conversion capacitors include a second conversion capacitor; and wherein the plural conversion switches of the capacitive power conversion circuit are configured to operably connect a first terminal of the second conversion capacitor to the DC output voltage and the charging voltage during the second conversion time period and the first conversion time period respectively, and to connect a second terminal of the second conversion capacitor to the charging voltage and the ground node during the second conversion time period and the first conversion time period respectively.

20. The capacitive power conversion circuit of claim 15, wherein the conversion control circuit further senses the DC output current or the charging current to generate a current related signal, and the power delivery unit regulates the DC output current to the predetermined output current level according to the current related signal.

* * * * *